Oct. 24, 1950 W. T. REA 2,527,153
REMOTE CONTROL SYSTEM
Filed June 2, 1945 5 Sheets-Sheet 3
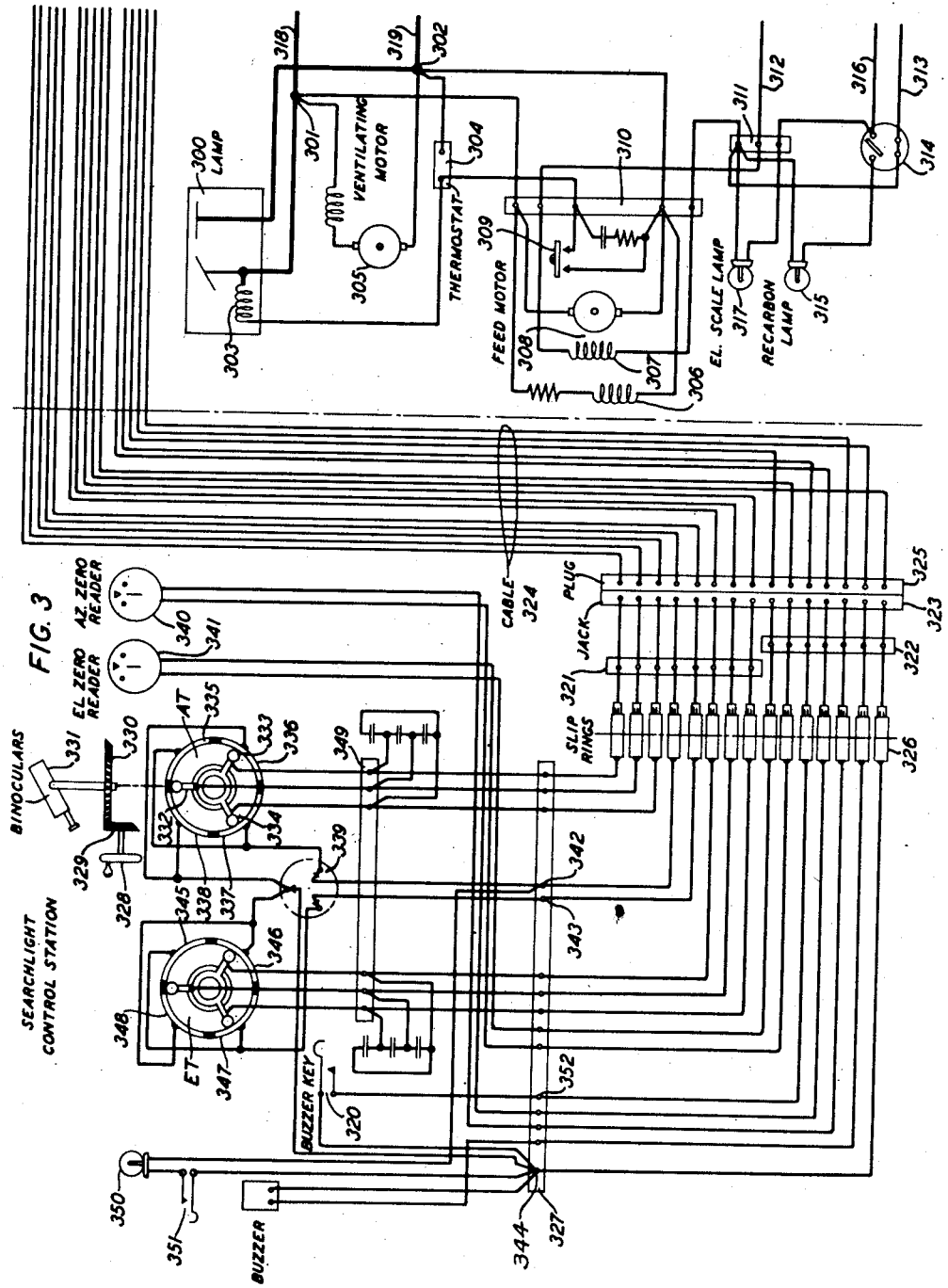
INVENTOR
W. T. REA
BY P. C. Smith
ATTORNEY Oct. 24, 1950 — W. T. REA — 2,527,153
REMOTE CONTROL SYSTEM
Filed June 2, 1945 — 5 Sheets-Sheet 4
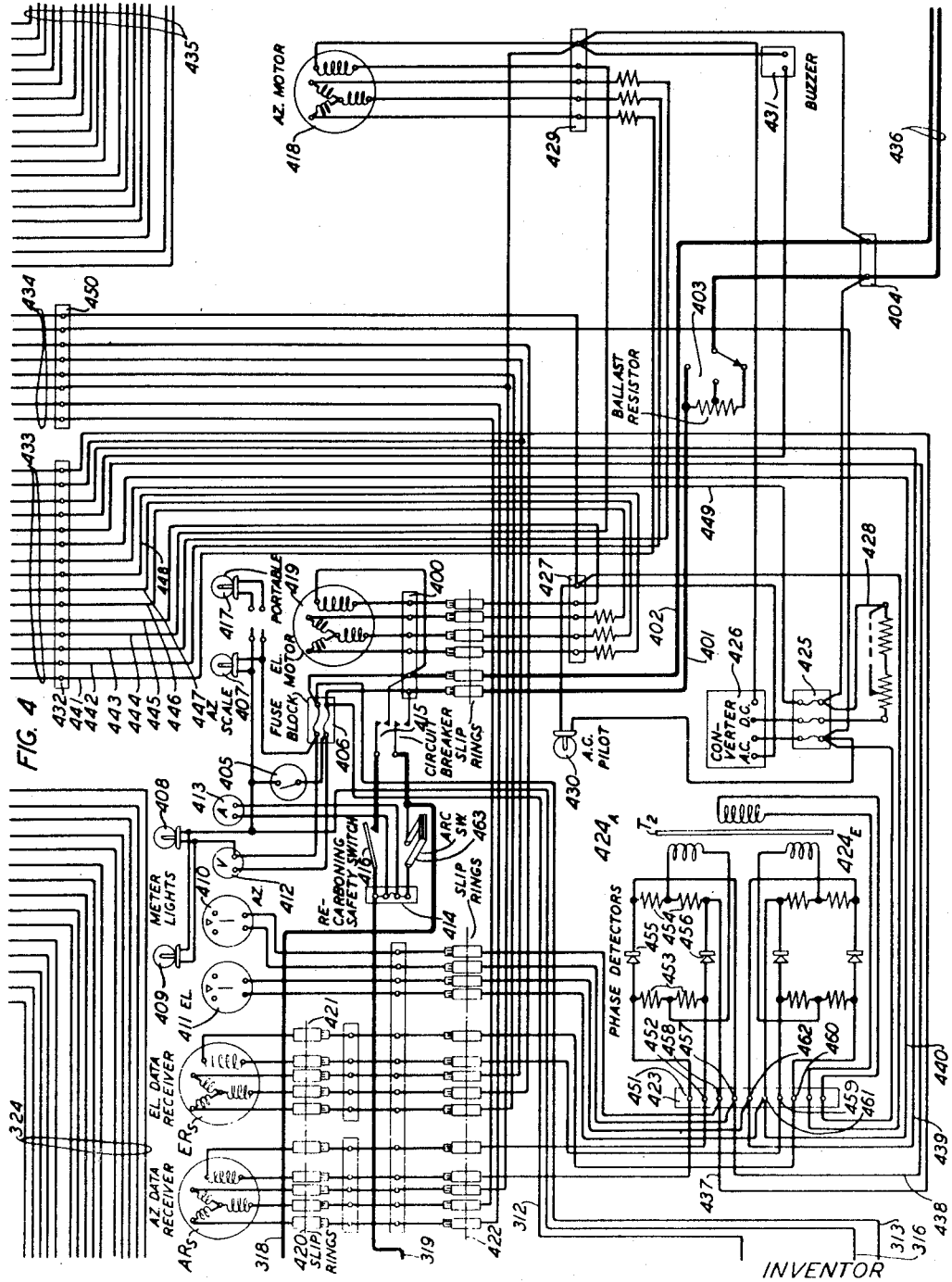
INVENTOR
W. T. REA
BY
P. C. Smith
ATTORNEY

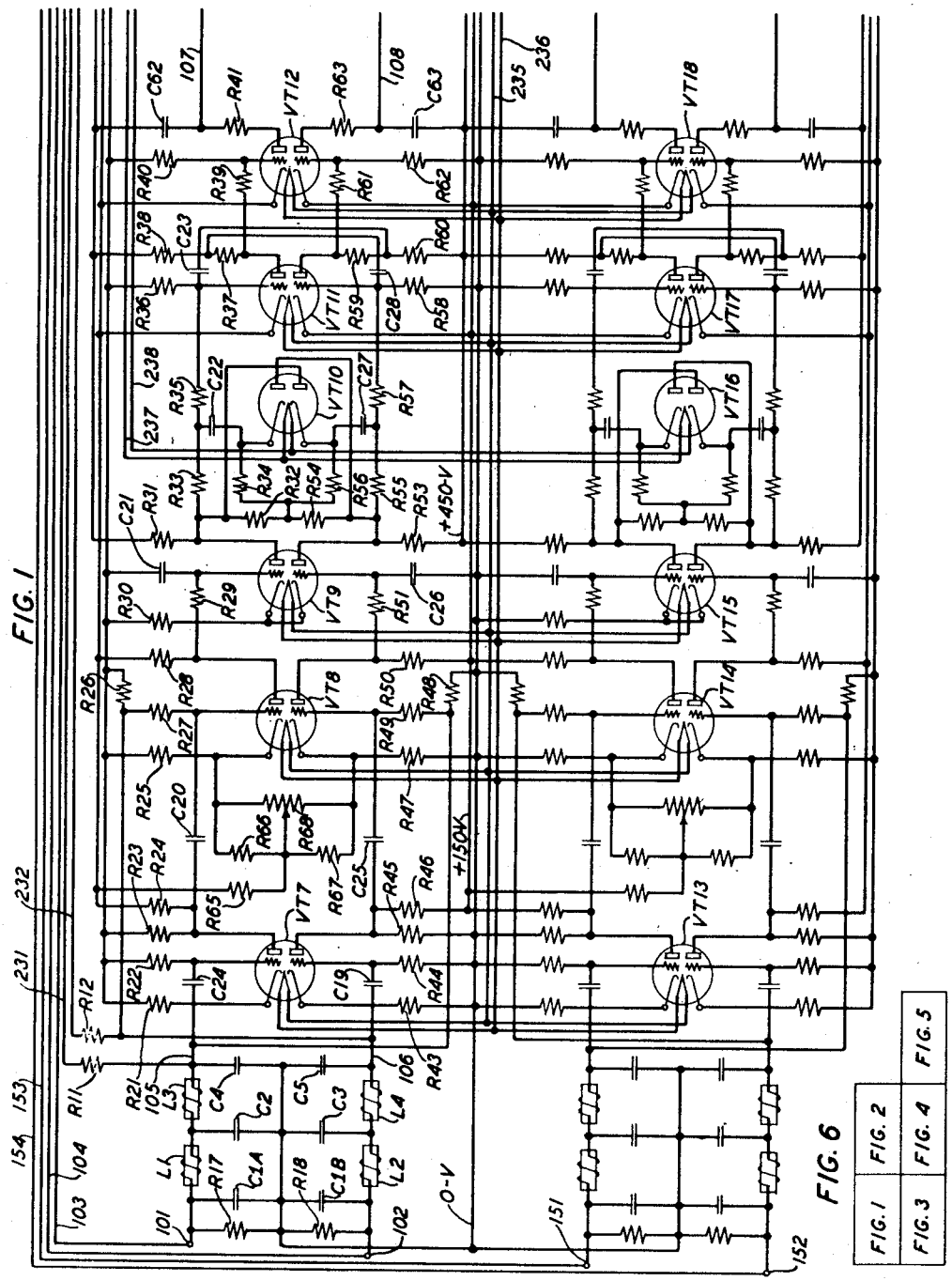

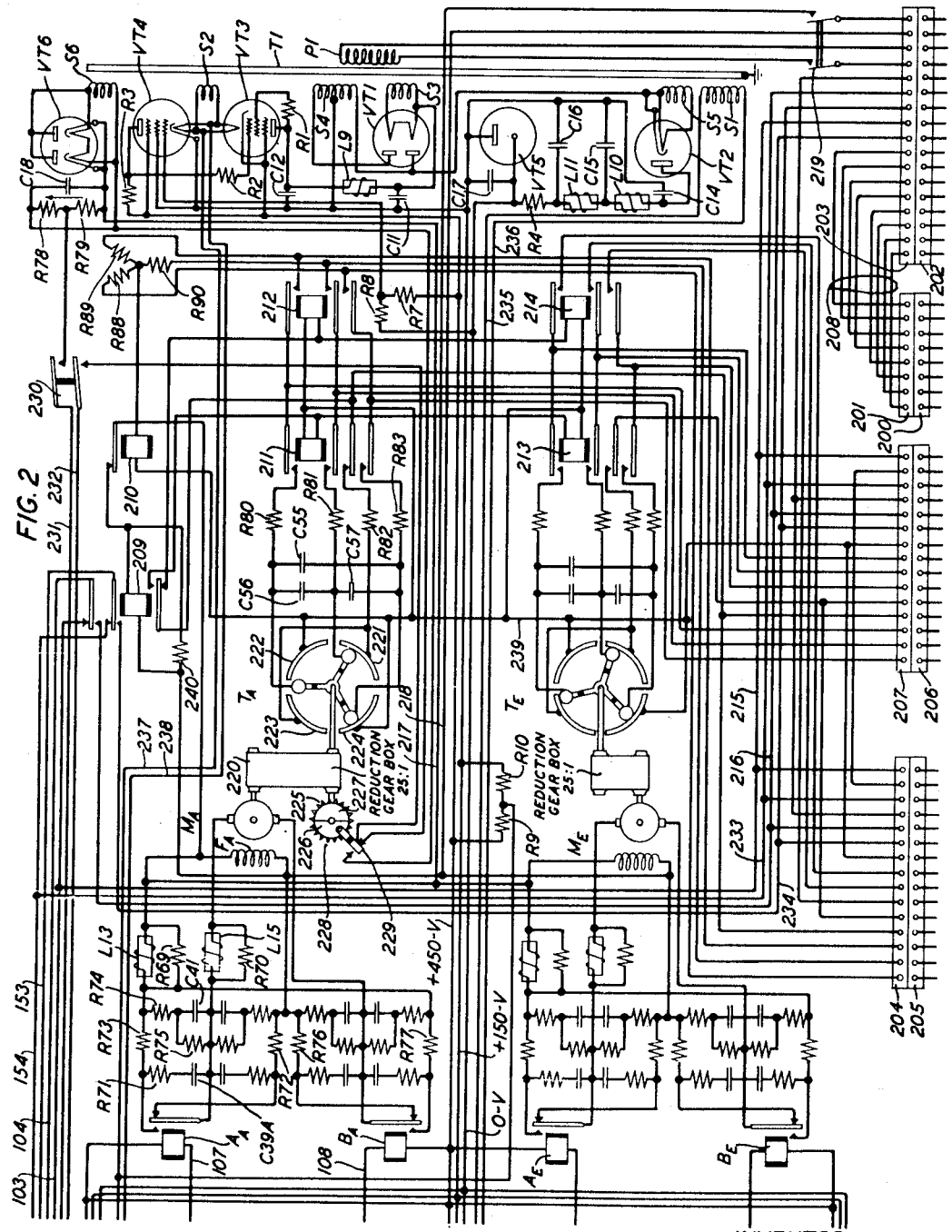

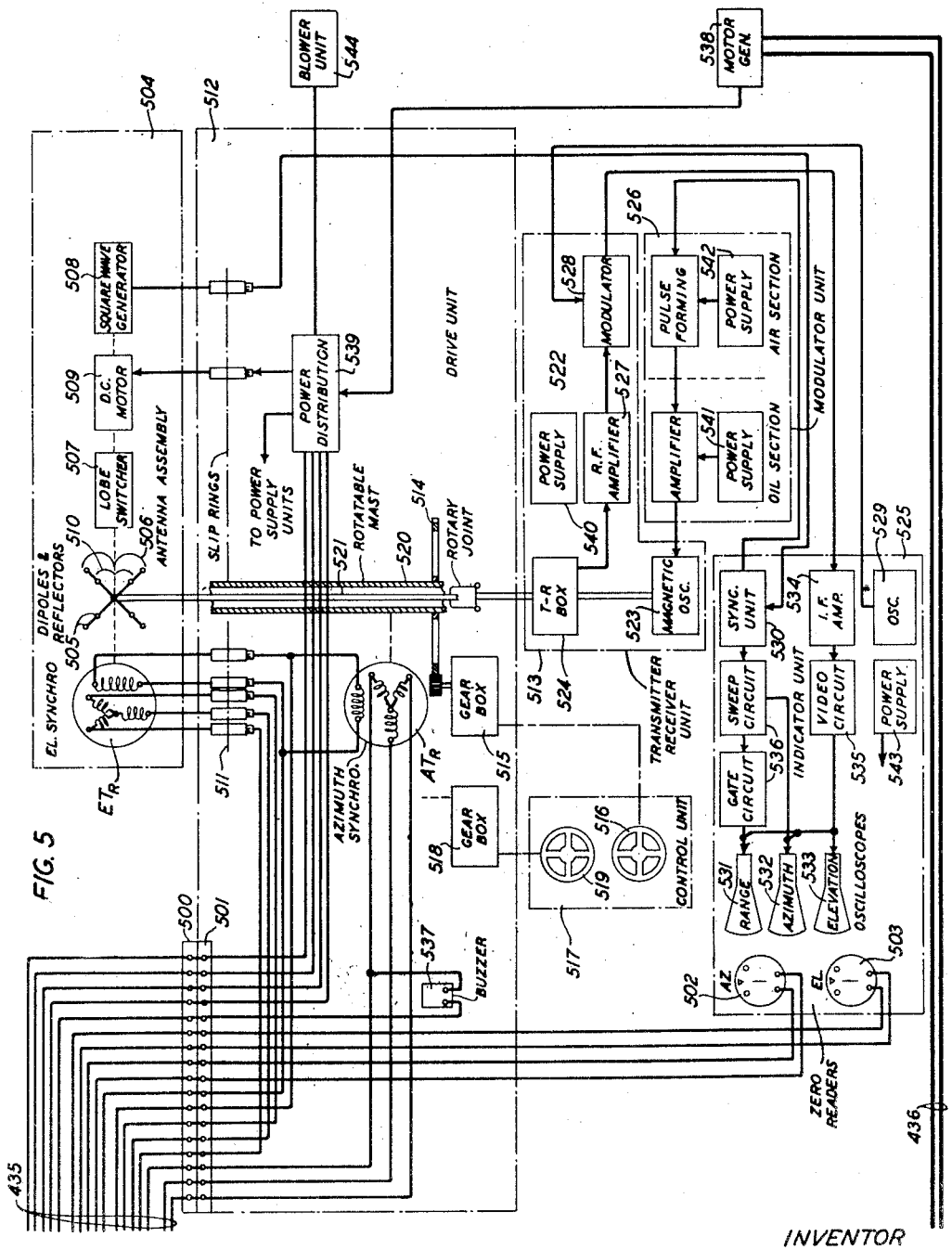

Patented Oct. 24, 1950

2,527,153

UNITED STATES PATENT OFFICE 2,527,153

REMOTE-CONTROL SYSTEM

Wilton T. Rea, Manhasset, N. Y., assignor to Bell Telephone Laboratories, Incorporated, New York, N. Y., a corporation of New York Application June 2, 1945, Serial No. 597,204

4 Claims. (Cl. 343—7)

This invention relates to a searchlight control system and more particularly to a system in which a searchlight may be kept automatically directed at a target under the control of a radar until the target approaches within optical range when the "radar" or radio direction and range device may be dismissed to search for other distant targets and the direction of the searchlight may then be controlled under the control of an optical tracker.

It has heretofore been proposed to automatically control the direction of a searchlight by a radar but it has been found difficult to accurately direct certain types of searchlights and more particularly those driven by step-by-step type motors due to the difficulty in maintaining matching errors of the radar and searchlight synchro transmitters as small as the width of the pointers of the zero reader meters used at the radar, searchlight and distant control station for indicating when the searchlight is pointed at the target being tracked by the radar.

It is the object of the present invention to enable a searchlight to be accurately pointed at an invisible target under the control of a radar until the target is within optical range and to then enable the searchlight beam to be maintained directed at the target under the control of an optical tracker at the searchlight control station.

In accordance with one feature of the present invention a synchro step-by-step converter is interposed between the searchlight and the radar. The converter receives the error voltage produced by the combination of the synchro transmitter of the radar and the synchro receiver of the searchlight in response to the orientation of the radar and searchlight in azimuth, amplifies such error voltage and applies the amplified error voltage to drive a small direct current motor which in turn drives a step-by-step transmitter of a type suitable to drive the step-by-step motor which operates the searchlight in its azimuth movement. The converter also receives the error voltage produced by the synchro transmitter of the radar and the synchro receiver of the searchlight in response to the orientation of the radar and searchlight in elevation, amplifies such error voltage and applies the amplified error voltage to drive a second small direct current motor which in turn drives a second step-by-step transmitter of a type suitable to operate the step-by-step motor which tilts the searchlight. These error voltages are those heretofore applied to operate the zero-reader meters at the searchlight control station and at the searchlight.

In accordance with a further feature of the invention provision is made in the converter and controllable from the control station for enabling the control of the searchlight to be switched from the radar to the control station so that a target may be tracked by the radar and the searchlight maintained trained upon the target by the radar until the target approaches within optical range, whereupon, in response to the operation of a switch at the control station the control of the searchlight may be switched from the radar to the control station whereafter the target may be tracked by optical observation and the searchlight maintained trained upon the target by the control station. The radar is thus rendered available for the detection of another target too distant to be detected optically.

Other features of the invention will become apparent upon reference to the following detailed description when read in connection with the accompanying drawing in which:

Figs. 1 and 2 taken together with Fig. 2 at the right of Fig. 1 disclose the synchro step-by-step converter; Fig. 1 disclosing in the upper portion thereof the azimuth servo-amplifier and disclosing in the lower portion thereof the elevation servo-amplifier; and Fig. 2 showing in the upper left portion thereof the azimuth servo-motor and step-by-step transmitter driven thereby, in the lower left portion thereof the elevation servo-motor and step-by-step transmitter driven thereby and in the right portion thereof the power supply equipment for supplying operating power to the vacuum tubes of the amplifiers of Fig. 1;

Fig. 3 shows schematically in the left portion thereof the equipment at the searchlight control station and in the right portion thereof the searchlight lamp, carbon feeding motor, vent motor and some of the control and indicating equipment of the searchlight unit;

Fig. 4 shows schematically the remaining equipment of the searchlight unit;

Fig. 5 shows schematically sufficient equipment of a radar unit by which the orientation of the searchlight may be controlled to enable an understanding of the invention; and Fig. 6 is a diagram showing how the several figures of the drawing should be arranged to completely disclose the invention.

*Searchlight unit*

The searchlight unit disclosed in Fig. 4 and in the right portion of Fig. 3 comprises an arc lamp 300, the carbons of which are connected to the positive and negative terminals 301 and 302, and the feed coil 303 of which is connected through the thermostat 304 between the terminals 301 and 302. Also connected across the terminals 301 and 302 is the ventilating motor 305, the voltage regulator 306 for the lamp and the armature circuit of the lamp carbon feed motor 308. The shunt field 307 of the motor is connected over terminals of the connector blocks 310 and 311 and over power supply leads 312 and 313, over terminals of connector block 400, over brushes and slip rings, over leads 401 and 402 of the power supply cable and through the ballast resistor 403 to the power supply receptacle 404. The recarbon lamp 315 is lighted over a circuit extending from the positive power lead 402 as traced over a terminal of receptacle 400, over lead 313, through the lamp 315, over switch 314, conductor 316, over switch 405 through the fuse block 406 and thence over power lead 401 of the power supply cable. When the switch 405 is closed the elevation scale lamp 317, the azimuth scale lamp 407 and the meter lamps 408 and 409 are connected in parallel over the fuse block 406 to the leads of the power supply cable whereby such lamps are lighted to illuminate the elevation and azimuth zero-readers 410 and 411, the voltmeter 412 and the ammeter 413.

Voltmeter 412 is connected through the fuse block and over slip rings to the leads 401 and 402 of the power supply cable to indicate the voltage of the power supplied to the searchlight and the ammeter 413 is connected to the ammeter shunt block 414. Power is supplied from the power cable through the circuit breaker 415, through the recarboning circuit switch 416 and over conductors 318 and 319 to the lamp terminals 301 and 302. A portable lamp 417 is provided which may be plugged up in parallel with the lamp 407.

Two motors are provided for orienting the searchlight in elevation and azimuth. The azimuth motor 418 is located in the base structure of the searchlight and its rotor shaft is connected through reduction gearing to rotate the upper portion of the searchlight in which the apparatus of the left portion of Fig. 3 and the apparatus disclosed above the slip rings and brushes of Fig. 4 is mounted whereby the searchlight lamp may be turned in azimuth. The elevation motor 419 is mounted in the upper rotatable portion of the searchlight structure and the rotor shaft is connected through reduction gearing to the horizontal shaft which tilts the searchlight in elevation.

Each of these motors is a multipoled three-phase motor with its stator windings positioned mechanically 120 degrees apart. The polarity and magnitude of direct current potentials applied from the brushes of a transmitter of the control station of Fig. 3 or a transmitter of the synchro step-by-step converter of Figs. 1 and 2 produce a rotating field which keeps the motor in a fixed relation with the brushes of the associated transmitter so that the two rotate at the same speed. The stator and rotor windings of motor 418 are connected over terminals of connector blocks 429 and 432 and conductors of cable 433 to contacts of a multiple jack 206 and stator and rotor windings of motor 419 are connected over slip rings and brushes, over terminals of connector blocks 427 and 432 and conductors of cable 433 to other contacts of jack 206.

Two synchro receivers ARs and ERs are provided in the searchlight assembly. Each of these receivers has a three-winding Y-connected stator and a single rotor winding. The rotor of the azimuth receiver ARs is connected by unity ratio gearing to the vertical shaft driven by the motor 418 which rotates the searchlight in azimuth and the rotor of the elevation receiver ERs is connected by unity ratio gearing to the horizontal shaft driven by the motor 419 which tilts the searchlight in elevation so that the receiver rotors have the same degrees of movement as the searchlight. The rotor windings of these receivers are connected over slip rings and brushes of the slip ring assemblies 420, 421 and 422 with terminals on the connector block 423 associated with the phase detectors 424$_A$ and 424$_E$. The stator windings are connected to terminals of the connector block 450 which are connected over conductors of cable 434 to contacts of jack 200 whereby they may be connected over the cable 208 terminating in multiple plugs 201 and 203, with the jack 202 connected by the cable 435 with plug 500 which in turn is connectable with the jack 501 and thence with the synchro transmitters AT$_R$ and ET$_R$ of the radar unit of Fig. 5.

The azimuth and elevation zero-reader meters 410 and 411 are connected over slip rings and brushes of the assembly 422 with other terminals of the connector block 423 associated with the phase detectors 424$_A$ and 424$_E$ which terminals are multiplied to terminals on the connector block 432 connected over conductors of cable 433, over contacts of jack 206 and plug 207, over contacts of plug 205 and jack 204, over conductors of cable 324 and with the corresponding zero-reader meters 340 and 341 at the searchlight control station and also in parallel over contacts of plug 203 and jack 202, the conductors of the cable 435 interconnecting the synchro step-by-step converter with the radar unit, and over contacts of the plug 500 and jack 501 with the zero-reader meters 502 and 503 at the radar unit.

Alternating current of 115 volts 60 cycles is supplied to the phase detectors 424$_A$ and 424$_E$ from the secondary windings of transformer T2, the primary winding of which is connected to terminals of connector block 423 one of which is connected through a fuse in block 425 to one alternating current output terminal of converter 426 and the other terminal of which is connected over a terminal on connector block 427 with the other alternating current output terminal of converter 426. The direct current terminals of converter 426 are connected over the fuse block 425 and through the voltage regulator 428 to the negative power supply terminal on receptacle 404 and over a terminal on connector block 429 to the positive power supply terminal on receptacle 404. The pilot lamp 430 which is bridged across the alternating current output of the converter 426 is lighted when the converter is functioning properly to produce an alternating current output.

To enable the searchlight attendant to be signaled from the control station of Fig. 3 a buzzer 431 is provided one terminal of which is connected to the positive power supply terminal of receptacle 404 and the other terminal of which is connected to a terminal of block 432 from which a connection may be made as will be later described to a buzzer key 320 at the searchlight control station.

Searchlight control station unit

The searchlight control station unit is provided with a base portion having connector blocks 321 and 322 to terminals on which are connected conductors terminating in the jack 323 which may be connected by cable 324 terminating at one end in plug 325 insertable into the jack 323 and terminating at the other end in the jack 205 in which the plug 204 of the synchro step-by-step converter unit may be inserted. The terminals on connector blocks 321 and 322 are connected with brushes of the slip ring assembly 326. The slip rings of the assembly are carried by the rotatable upper portion of the control station unit and are connected with terminals on the connector block 327.

The upper portion of the control station unit is rotatable in azimuth by a handwheel 328 and gears 329 and 330 as schematically illustrated whereby the binoculars 331 are given an azimuth orientation. The binoculars are also rotatable in elevation by another handwheel and gearing (not disclosed) whereby they may be kept trained on any distant target.

Rotatable in response to the rotation of the handwheel 328 through gearing (not shown), having a suitable step-up ratio, is an azimuth transmitter AT and rotatable in response to the orientation of the binoculars in elevation through gearing (not shown), having a suitable step-up ratio, is an elevation transmitter ET. The azimuth transmitter AT has three brushes 332, 333 and 334 which are mechanically positioned 120 degrees apart and are rotatable inside of a segmented circular ring. The circular ring is divided into four 90-degree segments 335, 336, 337 and 338 each of which comprises a 75-degree conducting portion and a 15-degree non-conducting portion. With the switch 339 in the closed position positive potential is connected from terminal 342 of connector block 327 to the oppositely disposed segments 335 and 337 of the ring of transmitter AT and negative potential is connected from terminal 344 of connector block 327 to the oppositely disposed segments 336 and 338 of the ring of transmitter AT. Similarly, positive potential is applied from the terminal 343 of connector block 327 to the oppositely disposed segments 345 and 347 of the ring of transmitter ET and negative potential is connected from terminal 344 to the oppositely disposed segments 346 and 348 of the ring of transmitter ET. The brushes of the transmitters AT and ET are connected to terminals on connector block 349 which terminals together with terminals 342 and 343 on connector block 327 are in turn connected over slip rings and brushes of the assembly 326 to terminals on the connector block 321 which, in turn, are connected to contacts of the multiple jack 323. As before stated, the jack 323 is connected by the cable 324 and over jack 205 to the synchro step-by-step converter whereby, as hereinafter described, the brushes and segments of the transmitters may be connected with the stator and rotor windings of the motors 418 and 419 of the searchlight.

The zero-reader meters 340 and 341 are connected to terminals on the connector block 327 which terminals are in turn connected over slip rings and brushes of the assembly 326 with terminals on the connector block 322 whereby, as previously described, they may be connected in parallel with the zero-reader meters of the searchlight and radar units and to the phase detectors 424A and 424E. For illuminating the zero-reader meters a lamp 350 is provided the circuit for which may be closed by the switch 351 from the positive power supply terminal 342 to the negative power terminal 344.

For signaling purposes a buzzer key 320 is provided which, when operated, establishes a circuit from the negative power terminal 344 to the terminal 352 on connector block 327, over a slip ring and brush of assembly 326 to a terminal on connector block 322, thence over contacts of jack 323 and plug 325, a conductor of cable 324, contacts of jack 205 and plug 204 contacts of plug 207 and jack 206, and thence as previously described through the buzzer 431 at the searchlight unit to the positive power supply terminal on receptacle 404. Key 320 also controls the closure of a parallel circuit extending over contacts of plug 203 and jack 202 and contacts of plug 500 and jack 501 through the buzzer 537 at the radar unit of Fig. 5.

*Radar control unit*

The radar unit shown schematically in Fig. 5 comprises an antenna assembly 504 consisting chiefly of four pairs of coaxially fed antenna radiators or dipoles 505; a main reflector 506 for directing the electromagnetic beam, a lobe switcher or mechanical rotating switch 507 for varying the phase of the voltages among the dipoles by a change of capacity thus shifting the direction of the beam; a square wave magneto type generator 508 and a direct current motor 509 which drives both the lobe switcher and the generator. The lobe switcher in combination with the symmetrically located dipoles causes the electromagnetic beam to rotate conically about its axis at an angle of about 4 degrees. The beam is actually shifted in four steps, first to the right, then down, then to the left and then up. A smaller auxiliary reflector 510 is located immediately in front of the main reflector to obtain a better field pattern. The square wave generator 508 establishes the basic timing interval for synchronizing all of the radar functions including the exact time at which outgoing pulses are transmitted and the control of the displays on the oscilloscope.

For transmitting the position of elevation of the antenna to the searchlight unit of Figs. 3 and 4 so that the searchlight may be elevated to the same position, the elevation synchro transmitter ETR is suitably connected by gearing to the shaft by which the antenna is tilted in elevation. The stator windings of this transmitter are connected over slip rings and brushes of the assembly 511 which is interposed between the antenna assembly and the drive unit indicated by the box 512, with contacts of the jack 501 which in turn is connected by contacts of plug 500, conductors of cable 435, contacts of jack 202, contacts of plugs 203 and 201, contacts of jack 200 and conductors of cable 434 to terminals on connector block 450 and thence to the stator windings of the synchro receiver ERs of the searchlight. The rotor winding of the transmitter ETR is also connected over other slip rings and brushes of the assembly 511 to contacts of jack 501 which in turn are connected by contacts of plug 500, conductors of cable 435, contacts of jack 202, contacts of plugs 203 and 201, contacts of jack 200 and conductors of cable 434 to terminals on connector block 450 and thence to the 60-cycle alternating current output of the converter 426 of the searchlight unit.

The drive unit 512 comprises the mechanical equipment located between the antenna assembly 504 and the transmitter unit 513. This equipment includes a ring gear 514 mounted on the mast 520, driven through a reduction gear box 515 from an azimuth control wheel 516 in the control unit 517 by which the antenna may be directed in azimuth. The drive unit also comprises mechanism (not shown) by which the antenna assembly may be tilted in elevation. This mechanism is driven through the reduction gear box 518 from a control wheel 519 in the control unit 517.

A synchro transmitter AT_R is suitably geared to the mast 520 for transmitting the position of azimuth of the antenna to the searchlight unit of Figs. 3 and 4 so that the searchlight may be rotated in azimuth to the same position. The stator windings of this transmitter are connected over contacts of jack 501 and plug 500, conductors of cable 435, contacts of jack 202, contacts of plugs 203 and 201, contacts of jack 200 and conductors of cable 434 to terminals on connector block 450 and thence to stator windings of the synchro receiver AR_S of the searchlight unit. The rotor winding of the transmitter AT_R is connected in parallel with the rotor winding of transmitter ET_R over the circuit previously described to the 60-cycle alternating current output terminals of the converter 426 at the searchlight unit.

The coaxial transmission line 521 is located within the rotatable mast 520 and provides a connection between the antenna assembly 505 and the transmitter-receiver unit 513. The transmitter-receiver unit 513 consists of a receiver unit 522, a transmitter unit 523, and a transmit-receiver box 524. Direct current impulses which are precisely timed and produced jointly by the square wave generator 508 and at indicator unit 525 are amplified to a high voltage in the amplifiers comprising the modulator unit 526 and are then impressed on the magnetron cathode causing the magnetron 523 to oscillate at an ultra-high frequency for most of the duration of the pulse. The short spurts of ultra-high frequency radio energy are transmitted through the coaxial transmission line 521 past the T-R box 524 and thence to the antenna dipoles 505.

The T-R box 524 is a high speed switching device which is arranged to separate the receiver 522 from the coaxial transmission line when the intense impulses are being transmitted.

The radio frequency receiver 522 uses resonant cavity type amplifiers 527 to provide two stages of amplification of the ultra-high frequency echo signals. The amplified ultra-high frequency pulses are then passed to a resonant cavity type modulator 528 together with a beat frequency which is adjustable to be 60 megacycles below the incoming radio frequency signals. The modulator converts the incoming radio frequencies to a 60-megacycle intermediate frequency. The beat frequency is generated by a resonant cavity type oscillator 529 located in the indicator unit 525.

The modulator unit 526 receives triggering pulses from the synchronizing or timing unit 530 of the indicator unit 525 and generates high voltage pulses which are transmitted to the magnetron oscillator of the transmitter 523 as previously stated. The modulator unit is made up of two separate sub-units; one an air unit and the other an oil unit, these types being descriptive of the methods employed for dissipating heat and for providing high voltage insulation. The air unit produces high voltage impulses, shapes the impulses and regulates their duration. The oil unit has a high voltage rectifier and voltage doubler to generate a positive 20-kilovolt supply used in conjunction with two pulse amplifiers which are driven by the pulses generated in the air unit. The output of the pulse amplifiers of the oil unit is delivered to the magnetron of the transmitter unit 523.

The indicator unit provides in a central location practically all of the electrical controls and indicators for operating the radar system. These include three oscilloscopes: a range oscilloscope 531 for indicating range; an azimuth oscilloscope 532 to provide indications for controlling the direction of the antenna in azimuth and an elevation oscilloscope 533 to provide indications for controlling the direction of the antenna in elevation.

The indicator unit has three principal functions which are performed by vacuum tubes and their associated circuits. These functions are: to provide basic timing intervals synchronized with the position of the electromagnetic beam; to furnish appropriately timed horizontal sweeps on the oscilloscopes and to unblank the cathode ray oscilloscopes at the proper intervals to display the target indications correctly; and to convert all incoming echo signals within the range of the radar system to a series of vertical deflections arising at scaled intervals on the range screen and to display those particular echo signals which are selected by the manually-set position of the range notch as vertical parallel pips on the azimuth and elevation oscilloscope screens.

As previously stated one unit of this equipment is the synchronizing or timing unit 530. The intermediate frequency amplifier 534 is a four-stage amplifier which receives the output from the receiver unit 522 and applies its amplified output upon the video amplifier 535. The video amplifier and gain control block 535 represent the equipment required for displaying vertical deflections on the screens of the oscilloscopes. The oscilloscopes are normally blanked out (no screen spots) and are unblanked only for the duration of a sweep. The sweep and unblanking functions, represented by the block 536, control the display of the horizontal sweep in the three oscilloscopes with respect to their initial starting periods, their lengths and their speeds.

As previously stated the indicator unit is also provided with zero-reader meters 502 and 503 for indicating to the radar operator when the searchlight has been oriented in azimuth and elevation positions corresponding to the direction of the radio beam. The buzzer 537 is also provided whereby the radio operator may be signaled from the searchlight control station.

Power is supplied to the radar equipment from the searchlight over a cable 436 extending from the power supply receptacle 404 at the searchlight to the motor generator unit 538. The direct current motor of the unit 538 is operated by power delivered over the cable 436 and drives a 27-volt direct current generator and a 110 to 120-volt 400-cycle alternating current generator. The generated power is supplied to the power distribution unit 539 from which power is supplied to the power supply unit 540 of the transmitter-receiver, to power supply units 541 and 542 of the modulator unit 526, and to power supply unit 543 of the indicator unit 525, to the blower motor 544 and over a slip ring and brush of the slip ring assembly 511 to the motor

509. 24-volt direct current and 400-cycle 115-volt alternating current is also supplied from the distribution unit 539, over contacts of jack 501 and plug 500, over conductors of cable 435 and contacts of jack 202 and plug 203 to the synchro step-by-step converter of Figs. 1 and 2.

Synchro step-by-step converter

The synchro step-by-step converter shown in Figs. 1 and 2 serves to amplify the error voltages applied by the phase detectors 424A and 424E of the searchlight to the zero-reader meters resulting from the out-of-phase setting of the searchlight with respect to the setting of the radar antenna.

The converter is provided with two substantially identical servo-amplifiers disclosed in detail in Fig. 1, motor control relays $A_A$, $B_A$, $A_E$ and $B_E$ operable from the outputs of the amplifiers, direct current servo-motors $M_A$ and $M_E$ controlled by the control relays, transmitters $T_A$ and $T_E$ driven by the motors $M_A$ and $M_E$, respectively, power supply equipment including the tubes VT1 to VT6, inclusive, shown in the right portion of Fig. 2, and control relays 209 to 214, inclusive.

The azimuth servo-amplifier disclosed in the upper portion of Fig. 1 is of the type fully disclosed in the application of B. Ostendorf, Jr., Serial No. 597,205 filed concurrently herewith which matured into Patent No. 2,472,611 issued June 7, 1949. The amplifier is responsive to a non-grounded pulsating control signal or error voltage applied across the input terminals 101 and 102 which are positive or negative only with respect to each other. A positive voltage on terminal 101 with respect to terminal 102 can exist, or conversely a positive voltage on terminal 102 with respect to terminal 101 can occur. The polarity of the voltage determines whether the motor $M_A$ will rotate in a clockwise or in a counter-clockwise direction and the amplitude of the voltage determines the relative speed at which the motor will run. Normally the input terminals 101 and 102 are interconnected over conductors 103 and 104 and the upper back contact of relay 209, but when relay 209 is operated the pulsating error voltage is applied across terminals 101 and 102 from the azimuth phase detector 424A of the searchlight unit over conductors 437 and 438 connected at the connector block 432 to conductors of cable 433 which, in turn, are connected over contacts of jack 206 and plug 207, conductor 215 and conductor 103 to terminal 101, and conductor 216, upper front contact of relay 209 and conductor 104 to terminal 102.

The pulsating error voltage supplied between the terminals 101 and 102 is filtered by the low-pass ladder type filter comprising the series-connected choke coils L1 and L3, L2 and L4, and bridged condensers C1 to C5, inclusive. The impedance of the filter matches the load impedance of 39,000 ohms (resistors R26 and R48) connected to the grid terminals of the twin triode amplifier tube VT8.

The double-resistor, double-capacitor bridge consisting of resistances R17 and R18, and condensers C1A and C1B balances out any spurious alternating current or direct current voltages leaking to terminals 101 and 102 or induced thereon. This is necessary because of the high gain amplification following. The condenser bridge is a low impedance shunt for extraneous high frequency voltages. The center tap of the bridge connects to the isolated O-V reference bus bar of the servo-amplifier. This establishes an arbitrary reference for the error voltages which are applied across the terminals 101 and 102. Thus with respect to other apparatus components of the amplifier one-half of the effective error voltage is positive or negative on one terminal as compared with the opposite polarity on the other terminal of the pair.

The double condenser bridge comprising condensers C4 and C5 with the center tap also connected to the O-V bus bar balances out any extraneous longitudinal voltage which may be present on the input terminals 101 and 102.

The twin triode equalizer tube VT7 has its control electrodes connected to the output conductors 105 and 106 of the filter section of the amplifier through condensers C24 and C19, respectively, and through resistors R22 and R44 with the O-V bus bar. Tube VT7 also has its cathode connected through the resistances R21 and R43 to the O-V bus bar. Plate potentials for the tube VT7 are supplied through the voltage dividers comprising resistors R23 and R24 for the plate of the upper unit and resistors R45 and R46 for the plate of the lower unit. One end of each of these voltage dividers is connected to the O-V bus bar and the other end of each divider is connected to the +150-V bus bar. Any 400-cycle alternating current hum which is superimposed in the output of tube VT7 is thus reduced in signal strength as regards the control grids of the succeeding amplifier tube VT8 in the ratio of 27,000 ohms to 147,000 ohms. This reduction in alternating current hum is accomplished without sacrificing gain in the equalizer tube VT7. The plates of tube VT7 are connected with the grids of the succeeding amplifier tube VT8 through the condensers C20 and C25.

The relative importance of the equalizer tube can be better understood if it is realized that the servo-amplifier could be operated with the tube removed from the socket. However, the tube adds a very desirable operating feature, namely that of increasing the effect of error voltage changes. This is of particular importance in connection with an error voltage change resulting from stopping or changing the direction of the control wheel 516 of an associated radar. A quick effective braking of the control circuit prevents the motor $M_A$ and the searchlight which is controlled by the motor from overrunning or overshooting.

The necessity for servo accuracy requires the use of a high gain amplifier which, of course, tends to offer the basic condition for producing electromechanical oscillations. In the event of a tendency to oscillate, the equalizer tube VT7 enables the mechanism to more rapidly recognize a change in the rate of motion. This tends to prevent it from overshooting through zero, then reversing its direction and coasting back past zero and continuing to do this thus setting up a "hunt" or oscillation.

Tube VT7 provides a class A amplifier having a rising gain versus frequency characteristic. The voltage gain is zero at zero cycles, about 7 at 5 cycles and rises to 10 at frequencies higher than 20 cycles. Accordingly there is no circuit function performed by the tube if the radar control wheel 516 is operated at a slow or at a very gradually accelerated rate.

The manner in which the equalizer tube functions is illustrated by the following example. It will be assumed that a positive error voltage changing in a positive direction exists on terminal 101 with respect to terminal 102. A positive direct current bias is placed on the control grid of the lower unit of tube VT8 whereas a negative voltage is impressed on the control grid of the lower unit of tube VT7. The output of the lower unit of tube VT7 is therefore in a positive direction. This positive voltage is connected to the control grid of the lower unit of tube VT8 to reenforce the error voltage rather than to oppose it. It can readily be shown that a similar correspondence in polarity exists between the error voltage and the output voltage of the upper unit of tube VT7 and that the voltages join to bias the grid of the upper unit of amplifier tube VT8.

It can be stated therefore that a change in error voltage produces a changing direct current component which places the equalizer tube VT7 in operation to magnify the signal voltage change and connect it to the succeeding amplifier stage.

The dual triode amplifier tubes VT8 and VT9 provide a two-stage high gain class A direct current amplifier. Tube VT8 has an amplification factor of about 70 to 1 and employs a high plate load resistance comprising resistors R28 and R50. A condenser-resistance filter is provided in the input leads of tube VT9 to reduce further any residual 400-cycle alternating current hum which may have passed the amplifier tube VT8. These filters comprise the resistor-condenser combinations R29—C21 and R51—C26.

The cathode resistor network associated with the tube VT8 produces a bias of about 1.5 volts and includes a screwdriver adjustable potentiometer R68 to permit the balancing of the tube operation by offsetting resistance variations of the apparatus. The resistance network includes the potentiometer R68 connected between the cathodes of the two units of tube VT8 connected in parallel with the series-connected equal resistances R66 and R67, the junction point between which latter resistors is connected to the slider of potentiometer R68 and through resistance R65 to the +150-V bus bar, and resistors R25 and R47 which connect the cathodes of the tube to the 0-V bus bar.

The cathode resistor R30 which is common to the two cathodes of the twin triode amplifier tube VT9 provides stabilized bias for such tube. Tube VT9 is directly coupled to the output of tube VT8 through the coupling resistors R29 and R51 and is connected in push-pull circuit to reduce longitudinal voltages arising from the variations in the preceding stages.

As in the case of the equalizer tube VT7, the servo-amplifier would operate even if the clutch tube VT10 were removed from its socket. However, the tube slows down the effect of those sudden large voltage changes which tend to cause the motor to rotate but does not effect changes which result in stopping the rotation of the motor. A sudden large error voltage may be presented to the amplifier when the servo-amplifier is switched into connection with the radar after a period of idleness or if a handwheel of the radar is jerked rather than moved at a uniform rate of speed. The clutch tube, a twin diode, temporarily short circuits any incoming positive error voltages. This condition lasts only during the brief period while either condenser C22 or condenser C27 is charging. Thus the tube tends to moderate extremely large error voltages by presenting them somewhat more gradually to the multivibrator tube, but it introduces no delay in braking the circuit.

Amplifier tube VT9 is directly coupled to the multivibrator tube VT11. The coupling between the upper units of these tubes comprises the voltage divider including resistors R31, R33, R35 and R36 connected in series between the +450-V bus bar and the 0-V bus bar, the plate of the upper unit of tube VT9 being connected to the junction point between resistors R31 and R33 and the grid of tube VT11 being connected to the junction point between resistors R35 and R36. The coupling between the lower units of these tubes comprises the voltage divider including resistors R53, R55, R57 and R58 connected in series between the +450-V bus bar and the 0-V bus bar, the plate of the lower unit of tube VT9 being connected to the junction point between resistors R53 and R55 and the grid of tube VT11 being connected to the junction point between resistors R57 and R58.

The twin diode clutch tube VT10 shunts only those voltage outputs of the amplifier tube VT9 which change in a positive direction. Due to the polarity relations of the circuit only one unit of tube VT10 conducts at any instant. To accomplish this the plates of amplifier tube VT9 are interconnected through the two resistors R32 and R54, the junction point between which resistors is connected through other resistors R34 and R56 with the cathodes of tube VT10. The cathode of the upper unit of tube VT10 is also connected through the condenser C22 to the junction point between resistors R33 and R35 and the cathode of the lower unit of tube VT10 is connected through condenser C27 to the junction point between resistors R55 and R57. The plate of the upper unit of tube VT10 is connected to the plate of the lower unit of tube VT9 and the plate of the lower unit of tube VT10 is connected to the plate of the upper unit VT9. The shunted positive voltage produced in one unit of the tube VT10 is superimposed on one grid of the multivibrator tube VT11 but in a direction opposite to that of the normal signal output from the amplifier tube VT9 and accordingly decreases the net difference otherwise existing between the two grids of the multivibrator tube VT11. Assuming that an error voltage at a particular instant is changing in a positive direction on the terminal 101, while it is changing correspondingly in a negative direction on terminal 102 then the polarity relations of the voltage conditions in the servo-amplifier circuit are as shown in the following table:

*Direction of voltage changes*

| Tube | Grids | | Plates | | Notes |
|---|---|---|---|---|---|
| | Upper | Lower | Upper | Lower | |
| VT7 | + | − | − | + | Signal voltages on grids are reenforced by output of the tube VT7. |
| VT8 | − | + | + | − | |
| VT9 | + | − | − | + | |
| VT10 | lower cathode is +, upper cathode is 0 | | | | |
| VT11 | −(S) | +(S) | +(S) | −(S) | (S) resulting from signal voltage. |
| | +(R) | | −(R) | | (R) resulting from rectifier action of tube VT10. |

It may be noted from the above table that the output voltages on the plates of the multivibrator tube VT11 will differ in peak values by amounts which are less than would result from the effect of error voltages alone due to the action of the clutch tube VT10. In other words the unbalance of the circuit is temporarily lessened. The shunting action of tube VT10 in temporarily reducing this voltage difference is effective in slowing down only sudden changes in voltage which would cause the motor $M_A$ to speed up. From its rectifying nature the tube has no effect on voltage changes in a negative direction which occur when braking the circuit for stopping the motor.

The dual multivibrator tube VT11 has symmetrical feedback circuits for each of its two units. Under balanced operating conditions during which both grid bias voltages are equal, the multivibrator oscillates to produce approximately balanced square waves at its plate terminals, the waves alternating at a frequency of about 40 cycles per second with approximately equal "open" and "closed" periods. The output from one plate is the inverted counterpart of the output from the other plate. This relationship results from the symmetrical circuit condition wherein the frequency of oscillation and the relation of the periods are established by the constants of the two resistor-condenser feedback circuits. One of these circuits includes the resistor R37 connected in series with condenser C28 between the plate of the upper unit of the tube and the grid of the lower unit. The other of these circuits includes the resistor R59 connected in series with condenser C23 between the plate of the lower unit of the tube and the grid of the upper unit. As before stated, the grids of the tube are also connected through resistors to the plates of the amplifier tube VT9.

The cathodes of the tube VT11 are connected to the +150-V bus bar and plate potential from the +450-V bus bar is supplied to the plate of the upper unit through serially connected resistances R37 and R38 and to the plate of the lower unit through serially connected resistances R59 and R60. If the signal voltages impressed on the two grids of tube VT11 should become unequal, then the periods of the square waves would become unequal. The time at which one unit of the multivibrator tube cuts off or again conducts then depends not only upon the resistor-condenser time constant of the circuit but also on the level of potential toward which the circuit tends to charge. For example with a given resistor-condenser circuit and a fixed starting voltage, it will take a longer time for the circuit to charge to a potential resulting in tube conduction if the charging cycle approaches a lower rather than a higher voltage on the grid.

It will be remembered from the preceding discussion that the various components of the servo-amplifier are balanced under operating conditions only when the servo-motor controlled searchlight and the radar are oriented in exactly the same direction since then no error voltage is impressed across the terminals 101 and 102. At all other times unbalanced voltages occur, the polarities and magnitudes of which vary depending upon the direction and amount that the radar and searchlight are out of phase. If unbalanced voltages are eventually connected to the grids of the two units of multivibrator tube VT11, the unbalanced voltages cause one unit to take a longer time to cut in than the other, thus producing unbalanced square waves as an output. The progression of the unbalanced periods of the waves in a positive or negative direction depends upon the direction in which the searchlight departs from the radar and the relative duration of the periods are approximately proportional to the magnitude of the out of phase relationship.

The multivibrator tube VT11 is coupled with the dual triode buffer tube VT12 which functions as a power amplifier. The plate of the upper unit of tube VT11 is coupled with the grid of the upper unit of tube VT12 through resistor R39 which is included in the voltage divider extending from the +450-V bus bar through the serially connected resistors R38, R37, R39 and R40 to the O-V bus bar. The plate of the lower unit of tube VT11 is coupled with the grid of the lower unit of tube VT12 through resistor R61 which is included in the voltage divider extending from the +450-V bus bar through the serially connected resistors R60, R59, R61 and R62 to the O-V bus bar.

The two outputs of the buffer tube VT12 operate two control relays $A_A$ and $B_A$ which jointly cause the motor $M_A$ to rotate in a clockwise or a counter-clockwise direction and at varying speeds. The plate of the upper unit of tube VT12 is connected through resistor R41, over conductor 107 and through the winding of relay $A_A$ to the +450-V bus bar and the plate of the lower unit of the tube VT12 is connected through resistor R63, over conductor 108 and through the winding of relay $B_A$ to the +450-V bus bar. Condenser C62 provides a shunt across the winding of relay $A_A$ to absorb the inductive disturbances arising from the operation and the release of the relay and condenser C63 performs a similar function in connection with relay $B_A$. An important function of the buffer tube is to separate the relays electrically from the multivibrator circuit so that inductive disturbances arising from the operation of the relays will not produce adverse effects in the multivibrator operation.

The relays $A_A$ and $B_A$ are preferably of the mercury contact type such as is disclosed in the application of E. T. Burton Serial No. 545,985, filed July 21, 1944, which issued January 18, 1949 as Patent No. 2,459,306 but relays of other types could be used, provided they are fast in operation, sensitive and are capable of handling a considerable contact load. Each of these relays comprises an envelope of glass or other suitable material through the bottom of which an armature terminal is sealed and through the top of which two other terminals are sealed. Secured to the inner end of one of the upper terminals is a front contact of magnetic material and secured to the inner end of the other upper terminal is a back contact of non-magnetic material. Secured to the lower terminal by a reed is an armature of magnetic material biased against the back contact and attractable toward the front contact. A pool of mercury is placed in the bottom of the envelope from which mercury is conducted to the contacts by wick action. Surrounding the envelope is an operating coil or winding which when energized sets up a flow of magnetic flux through the armaturer and front contact to cause the movement of the armature towards the front contact.

The motor $M_A$ has its field $F_A$ connected across supply conductors 217 and 218 and through contacts of switch 219 to which a source of 24 volts direct current is connected from the radar as previously described. The armature circuit of the motor is connected between the swing contacts of the relay through the choke coil L15 paralleled by resistance R70 to limit the alternating component of the current in the motor armature and to serve to smooth the operation of the motor. The choke coil L13 paralleled by resistor R69 is included in the connection from supply conductor 217 to the front contacts of the relays to minimize contact deterioration during the brief periods when a contact transfer occurs in either relay and all the contacts are in engagement. A network of resistors and condensers is provided for protecting the contacts of the relays. For example, the swing and front contact of relay $A_A$ are bridged by the series combination of resistor R71 and condenser C39A and also a bridge consisting of resistor R74 in series with a parallel combination involving resistor R75 and condenser C41. These bridges are separated by an inductive resistor R73. Similar networks are provided for protecting the swing and front contact of relay $A_A$, the swing and front contact of relay $B_A$ and the swing and back contact of relay $B_A$.

The association of the two control relays $A_A$ and $B_A$ with the multivibrator and buffer tube previously described provides an arrangement whereby one relay is operated while the other is released. The relays operate in this manner at a rate of about 40 cycles per second. If the servo-amplifier is in a balanced condition, that is, no error voltage is applied across the terminals 101 and 102, symmetrical square waves are produced at the outputs of the buffer tube VT12 and the relays $A_A$ and $B_A$ alternately operate and release in response to the essentially square waves but in an opposite order.

Accordingly with relay $A_A$ operated and relay $B_A$ released, current will flow from conductor 217 of the power supply through the resistor R69 in parallel with choke coil L13, through resistor R73, over the front contact of relay $A_A$, through resistor R70 in parallel with choke coil L15, through the armature circuit of motor $M_A$, over the back contact of relay $B_A$ and through resistor R76 to conductor 218 of the power supply. When relay $B_A$ is operated and relay $A_A$ is released, current will flow from conductor 217 of the power supply through resistor R69 in parallel with choke coil L13, through resistor R77, over the front contact of relay $B_A$, through the armature circuit of motor $M_A$, through the resistor R70 in parallel with choke coil L15, over the back contact of relay $A_A$ and through resistor R72 to conductor 218 of the power supply. These impulses of power are equal and are transmitted alternately in opposite directions through the armature circuit of the motor and accordingly the net direct current voltage connected across the armature circuit of the motor is zero and the motor remains at rest. However, the armature will vibrate sufficiently to overcome the static friction of the motor enabling the motor to rotate smoothly at very low speed.

If unbalanced voltage conditions exist, resulting for example in relay $A_A$ remaining in its front contact closure position for a longer time in any given interval than it remains in its back contact closure position and at the same time, relay $B_A$ remains in its back contact closure position for a longer time than it remains in its front contact closure position, the impulse of power transmitted through the armature circuit of the motor $M_A$, when relay $A_A$ is operated and relay $B_A$ is released, will be lengthened and the impulse of power transmitted in the opposite direction through the armature circuit of the motor when relay $A_A$ is released and relay $B_A$ is operated will be shortened and the net voltage across the armature circuit of the motor will cause the motor to turn in one direction of rotation. This net effective voltage will, of course, govern the speed of rotation. A higher net voltage results if the closed periods for operating one of the relays greatly exceed in duration the open periods in which the relay is released.

The azimuth motor $M_A$ drives the transmitter $T_A$ through the gear box 220 which has a reduction gear ratio of 25 to 1. The transmitter is of the same type as the transmitters AT and ET of the searchlight control station previously described. The brushes of the transmitter are interconnected by the bridging condensers C55, C56 and C57 to reduce sparking when a brush passes from a conducting to a non-conducting segment and four current limiting resistors R80, R81, R82 and R83 are connected between the brushes and the positive potential segments 221 and 223 of the transmitter and the front contacts of relay 211.

The motor $M_A$ also drives the friction-operated switch 225. This switch comprises two semicircular segments 226 and 227 having grooved peripheries and mounted on the shaft which drives the brushes of the transmitter $T_A$ and held in frictional engagement with such shaft by a spiral spring 228 disposed in the grooves of the segments 226 and 227. Secured to the segment 226 and insulated therefrom is a switch arm 229 the free end of which is mounted for movement between two fixed contacts which are connected to the ends of a resistance bridge comprising resistors R78 and R79. The junction point of the bridge may be connected over one contact of the azimuth lead switch 230, over conductor 231 and through resistor R11 with the output conductor 105 of the filter section of the azimuth servo-amplifier and the switch arm 229 is connected over another contact of switch 230, over conductor 232 and through resistor R12 with the output conductor 106 of such filter section.

For supplying potential across the bridge consisting of resistors R78 and R79, shunted by condenser C18, the lead voltage rectifier tube VT6 is provided. This tube is a twin diode having its two plates connected together and to one terminal of the secondary winding S6 of power transformer T1 and having its cathodes also connected together and to one terminal of the resistance bridge and having its filament heated by current supplied from the secondary winding S6. The lower terminal of the secondary winding is connected to the other terminal of the resistance bridge. The tube VT6 thus rectifies the 6.4-volt, 400-cycle alternating current applied to the secondary winding S6 of the transformer and applies such rectified current across the resistance bridge whereby the junction point between the resistors R78 and R79 is negative with respect to the outside terminal of resistor R79 and is positive with respect to the outside terminal of resistor R78.

The movement of the switch arm 229, through the frictional driving connection with the shaft of transmitter $T_A$ with either of its fixed contacts, provides a means for connecting a predetermined value of voltage as determined in value by the rectifier tube VT6 and bridge resistors R78 and R79, over the contacts of the lead switch 230, conductors 231 and 232 to conductors 105 and 106 of the azimuth servo-amplifier which accentuates the error voltage to cause the motor-driven transmitter $T_A$ to advance further than it otherwise would. This lead tends to offset inherent lag in the searchlight driving system.

The fixed error voltage is normally disconnected from conductors 231 and 232 at the contacts of switch 225. The switch arm is arranged so that the lower fixed contact is engaged when the motor revolves in one direction whereas the upper fixed contact is engaged when the motor revolves in the opposite direction. Keeping in mind this arrangement and the polarities of the non-grounded rectifier tube VT6 output voltage with respect to the junction point between resistors R18 and R19, it may be noted that if voltage is connected through the lower fixed contact of switch 225 to conductor 232, this voltage is negative with respect to that connected to conductor 231. On the other hand, if voltage is connected through the upper fixed contact of switch 225 to conductor 232, this voltage is positive with respect to that connected to conductor 231.

The elevation servo-amplifier shown in the lower portion of Fig. 1, the relays $A_E$ and $B_E$, the servo-motor $M_E$ and the transmitter $T_E$ controlled by the amplifier, are identical in structure and function with the similar elements of the azimuth servo-amplifier just described except that the lead switch 225 and connections therefrom to the input of the servo-amplifier are omitted since tilting of the searchlight in elevation tends to be done more gradually than rotation in azimuth and inherent delays in the elevation searchlight control system are therefore of less significance. Normally the input terminals 151 and 152 of the elevation servo-amplifier are interconnected over conductors 153 and 154 and the upper inner back contact of relay 209 but when relay 209 is operated the pulsating error voltage is applied across the terminals 151 and 152 from the elevation phase detector 424E of the searchlight unit over conductors 439 and 440 connected at the connector block 432 to conductors of cable 433 which in turn are connected over contacts of jack 206 and plug 207, conductor 233 and conductor 154 to terminal 152, and over conductor 234, over the inner upper front contact of relay 209 and over conductor 153 to the terminal 151.

Power for operating the tubes of the servo-amplifiers is provided by the equipment shown in the right portion of Fig. 2. Power of 400 cycles at 115 volts is secured from the motor generator unit 538 of the radar unit as previously described and is transmitted over contacts of jack 501 and plug 500, conductors of cable 435, contacts of jack 202 and plug 203, and over contacts of switch 219 through the primary winding P1 of the power transformer T1. Heating supply current is supplied to the filaments of tubes VT7, VT8, VT9, VT11 and VT12 of the azimuth servo-amplifier and to the filaments of tubes VT13, VT14, VT15, VT17 and VT18 of the elevation servo-amplifier over conductors 235 and 236 from the secondary winding S1 of transformer T1. Heater supply current is applied through the filaments of tubes VT10 and VT16 over conductors 237 and 238 from the secondary winding S2 of transformer T1.

For supplying +300 volts between the +450-V and +150-V bus bars the full wave rectifier tube VT1 is provided, the filament of which is heated by current from the secondary winding S3 of the transformer T1. Secondary winding S4 of transformer T1 supplies 400-cycle 400-volt alternating current to the plates of tube VT1, the mid-point terminal of the winding S4 being connected to the +150-V bus bar.

The rectified output of tube VT1 is smoothed by a filter consisting of the series choke coil L9 and the bridged condensers C11 and C12 and is regulated at a potential of about +300 volts with respect to the +150-V bus bar connected to the center tap of the secondary winding S4 of transformer T1. This regulation is accomplished by vacuum tubes VT3 and VT4. The pentode tube VT3 serves as a variable impedance connected in series between the output of tube VT1 and the +450-V bus bar. The value of the impedance in series with the output depends upon the plate-cathode current of tube VT3 which in turn is changed by the potential connected to the control grid of the same tube. The control grid is influenced by the voltage drop across resistance R3, a drop which is caused by the plate-cathode current of the amplifier pentode tube VT4.

The plate-cathode current of tube VT4 changes depending on variations in the potential connected to the control grid of this tube. A varying grid potential is obtained from a point on a voltage divider bridge comprising resistors R7 and R8 connected between the +450-V and the 0-V bus bars.

If the voltage on the bus bar designated +450-V should tend to rise, a proportion of the voltage difference between this point and 0 volts is impressed on the control grid of tube VT4 and results in an increased plate-cathode current and accordingly an increased voltage drop across the resistor R3. This increased voltage drop lowers the potential on the control grid of the regulator tube VT3 thereby reducing its plate output. The reduction in output is, of course, accomplished by an increase in the impedance between the plate and cathode of tube VT3, thus tending to lower the voltage on the +450-V bus bar. All of these actions to bring the output into regulation occur almost instantaneously.

In a similar manner a tendency of the voltage between the bus bars +450-V and 0-V to decrease causes a decrease of the potential applied to the control grid of tube VT4 which results in a decrease in the plate-cathode current and accordingly a decreased voltage drop through resistor R3. This decreased voltage drop increases the potential on the control grid of the regulator tube VT3 thereby increasing its plate current. Increase in output is accomplished by a decrease in the impedance between the plate and cathode of tube VT3 thus tending to raise the voltage on the +450-V bus bar. As stated previously, all of these actions take place almost instantaneously.

The junction of the two resistors R9 and R10 bridged in series between the +450-V and +150-V bus bars is connected to the filaments of tubes VT3, VT4, VT10 and VT16 to keep the potentials of these tubes within the heater to cathode voltage requirement. Anti-sing resistors for parasitic suppression include the screen grid resistor R1 and the grid resistor R2 associated with tube VT3.

For supplying voltage between the +150-V and 0-V bus bars, a half wave rectifier tube VT2 is provided. A 400-volt, 400-cycle alternating current input to the tube is obtained from the lower half of the secondary winding S4 of transformer T1 and the filament is heated from the secondary winding S5 of the transformer. The direct current output from the plate of tube VT2 is smoothed by a double section filter comprising the series choke coils L10 and L11 and the bridged condensers C14, C15 and C16. The rectified voltage output is reduced by the series resistor R4 and the output potential is fixed at 150 volts by the shunt regulator gas tube VT6. Condenser C17 also absorbs any voltage surges which might be generated by gas tube VT6.

Nine circuits extending between the synchro step-by-step converter and the searchlight unit are required for controlling the azimuth and elevation motors 418 and 419 of the searchlight unit. These conductors include conductors 441 to 444, inclusive, extending from the stator and rotor windings of the azimuth motor 418 to terminals on the connector block 432, thence over conductors of cable 433 and contacts of jack 206 and plug 207 to armatures of relays 211 and 212; include conductors 445 to 448, inclusive, extending from the stator and rotor windings of the elevation motor 419 to terminals of the connector block 432, thence over conductors of cable 433 and contacts of jack 206 and plug 207 to armatures of relays 213 and 214 and includes conductor 449 which extends from the negative terminal of the power supply at receptacle 404 of the searchlight unit to a terminal on connector block 432 and thence over a conductor of cable 433 and contacts of jack 206 and plug 207 to conductor 239.

Relays 211 and 213 each have one winding terminal connected to the negative power supply conductor 239 and have their other winding terminals connected to the lower front contact of relay 209, the lower armature of which latter relay is connected over a conductor of cable 433 and conductor 444 through the rotor winding of the azimuth motor 418 of the searchlight to the positive terminal of the power supply at receptacle 404. Thus when relay 209 is operated relays 211 and 213 become operated to connect the transmitters $T_A$ and $T_E$ over conductors of cable 433 and conductors 441 to 448, inclusive, with the azimuth and elevation motors 418 and 419 of the searchlight unit.

Relays 212 and 214 each have one winding terminal connected to the negative power supply conductor 239 and have their other winding terminals connected to the lower back contact of relay 209 and thence as traced to the positive power supply terminal at receptacle 404 so that when relay 209 is unoperated relays 212 and 214 become operated to connect the stator windings of the azimuth and elevation motors 418 and 419 in circuit over the front contacts of such relays, over contacts of plug 204 and jack 205 over conductors of cable 324 and contacts of plug 325 and jack 323 to terminals on connector block 321 at the searchlight control station and thence as previously traced to brushes of the transmitters AT and ET. The rotors of the motors 418 and 419 are connected over conductors 444 and 445, over conductors of cable 433, contacts of jack 206 and plug 207, contacts of plug 204 and jack 205, conductors of cable 324, contacts of plug 325 and jack 323 and terminals of connector block 321 at the searchlight control station and thence as traced over contacts of switch 339 when operated to segments of the transmitters AT and ET.

Relay 209 is operable in a circuit from 24-volt supply conductor 216 through its winding in parallel with resistance 240 and over the back contact of relay 210 to the other supply conductor 217. Thus when relay 210 is unoperated relay 209 operates and in turn causes the operation of relays 211 and 213. Relay 210 is operable in a circuit extending from the negative power supply conductor 239, through its winding to the junction point between resistors R88, R89 and R90 and thence over the three circuits previously traced to the brushes of the transmitter AT at the searchlight control station whereupon when the switch 339 is operated a circuit will be completed over some one or more of the three circuits depending upon the position of the brushes of the transmitter, over segments 335 and 337, contacts of switch 339, terminal 342, on the connector block 327 and thence as traced to the positive terminal of the power supply on receptacle 404 at the searchlight unit. Relay 210 thus operates if the switch 339 at the searchlight is operated regardless of the position of the brushes of the transmitter AT.

*Operation of the system*

The apparatus illustrative of the invention having now been described in detail, the manner in which the invention functions will now be discussed. The target while beyond searchlight range is first tracked by the radar unit and during such tracking switch 339 at the searchlight control station is maintained in its open position whereby relay 210 at the synchro step-by-step converter is unoperated, relays 209, 211 and 213 are operated and relays 212 and 214 are unoperated. As previously described, with relay 209 operated the input terminals 101 and 102 and 151 and 152 of the azimuth and elevation servo-amplifiers are associated with the phase detectors 424A and 424E at the searchlight unit, and the azimuth and elevation synchro transmitters $AT_R$ and $ET_R$ are associated with the azimuth and elevation synchro receivers $AR_s$ and $ER_s$, respectively, and with the phase detectors 424A and 424E.

If it be assumed that the searchlight is oriented in azimuth to a position corresponding to the azimuth orientation of the radar antenna, 400-cycle alternating current voltage applied to the rotor winding of the azimuth synchro transmitter $AT_R$ at the radar unit and impressed upon the stator windings of such transmitter will cause voltages to be applied over the conductors extending to the corresponding stator windings of the azimuth synchro receiver $AR_s$, but if the rotor winding of the receiver is assumed to be positioned in a synchronous position with respect to the rotor winding of the radar synchro transmitter $AT_R$, the sum of the voltages induced into the rotor winding of receiver $AR_s$ from its stator windings will be zero and the azimuth phase detector 424A will produce no error voltage. As a consequence the voltages applied from the phase detector over conductors 437 and 438 to the input terminals 101 and 102 of the azimuth servo-amplifier will be equal and there will be no response by the servo-amplifier.

It will now be assumed that the radar antenna is rotated to a different relative direction from that of the searchlight and that the rotor windings of the synchro transmitter $AT_R$ and synchro receiver $AR_s$ become displaced with respect to each other. This displacement causes the generation of an alternating current voltage in the circuit of the rotor winding of the receiver $AR_s$ which is impressed across the input terminals 451 and 452 on the connector block 423 associated with the azimuth phase detector 424A. With 60-cycle voltage applied through the windings of transformer $T_2$ between the mid-tap of the resistance 453 bridged across the input terminals 451 and 452 and the mid-tap of resistance 454 bridged across the output terminals 457 and 458, current will flow through the rectifiers 455 and 456 in parallel during each positive half cycle of the 60-cycle alternating current source and as a consequence the resistance of both the rectifiers will be reduced.

Dependent upon the phasing of the voltage applied to the input terminals 451 and 452 from the synchro receiver ARs, positive voltage will be applied to either rectifier 455 or rectifier 456 at the same time that its resistance has been decreased and negative voltage will be applied to the other rectifier. As a consequence the resistance of one rectifier is further decreased and the resistance of the other rectifier is increased and positive voltage pulsating at a frequency of 60 cycles per second will appear on either output terminal 457 or 458 and will be applied therefrom over the circuits previously traced in the input terminal 101 or terminal 102 of the azimuth servo-amplifier, and the negative voltage appearing on the other terminal of the pair 457 and 458 and applied therefrom to the other input terminal 101 or 102 of the amplifier becomes less positive, or negative with respect to the voltage applied to the other terminal of the pair 101, 102. The amplitude of this change in voltage depends upon the relative amount of the angular displacement between the rotors of the synchro transmitter $AT_R$ and the synchro receiver ARs and the polarity of the voltage depends upon the direction of rotation producing the change.

This error voltage is registered at the searchlight unit, at the searchlight control station and at the radar unit by the deflection of the needles of the azimuth zero-reader meters 410, 340 and 502, the windings of which are connected in parallel between the output terminals 457 and 458 at the azimuth phase detector 424A. The needles will remain deflected until the searchlight is rotated in azimuth to a position corresponding to the position assumed by the radar antenna.

The pulsating error voltages applied to the input terminals 101 and 102 of the azimuth servo-amplifier are, as previously described, filtered and amplified by the voltage amplifier tubes VT8 and VT9, and the amplified voltages are applied to the control grids of the multivibrator tube VT11. The outputs from the tube VT11 are further amplified by the buffer or power amplifier tube VT12 to cause the control relays $A_A$ and $B_A$ to operate and release in alternation at a frequency of approximately 40 cycles per second. The effect of these error voltages will be to cause the periods during which relay $A_A$ or relay $B_A$ is operated to be increased and to cause the periods during which the other of the relays is operated to be decreased. The lengths of time either relay remains operated while the other is released depends upon the polarity and amplitude of the error voltage.

The pair of relays vibrating in opposite phase, as above described, serves the dual purpose of rotating the motor $M_A$ and the transmitter $T_A$ driven thereby in a clockwise or a counter-clockwise direction as determined by the polarity of the error voltage and of rotating it at a speed proportional, for small values of voltages, to the amplitude of those voltages. The operating voltage connected across the armature of the motor $M_A$ is related to the relative length of time the vibratory contacts of the relays are closed as compared to the length of time they are open. The greater the difference in the length of the opened and closed periods the greater will be the net voltage connected in one direction or the other across the armature of the motor. This provides a variable speed control since the speed of the motor varies in proportion to the voltage connected across its armature.

With relay 211 operated as previously described the rotation of the brushes of the transmitter $T_A$ transmits impulses through the stator windings of the azimuth motor 418 of the searchlight unit and with the rotor circuit of the motor also established to the positive voltage segments of the transmitter $T_A$ through the operation of relay 211, the motor 418 rotates in such a direction that it rotates the searchlight in a direction to direct the beam therefrom in azimuth towards the target which has been detected by the radar unit. As a consequence of such rotation the rotor of the synchro receiver ARs is rotated until, when the searchlight has reached an azimuth position corresponding to the azimuth position of the radar antenna, such rotor winding will impress no error voltage upon the input terminals 451 and 452 of the azimuth phase detector 424A and no error voltage will appear on the input terminals 101 and 102 of the azimuth servo-amplifier. Therefore, the motor $M_A$ will come to rest and the transmitter $T_A$ will cease transmitting impulses to the motor 418 and the motor 418 will come to rest.

In a similar manner when the radar antenna is tilted in elevation to direct the radio beam on the target, the elevation synchro transmitter $ET_R$, which is connected with the synchro receiver ERs, of the searchlight unit, will cause the generation of an error voltage across the input terminals 459 and 460 of the elevation phase detector 424E and will cause the generation of a pulsating voltage across the output terminals 461 and 462, the polarity of which will depend upon the direction of the rotation of the elevation transmitter $ET_R$ producing the change and the amplitude of which will depend upon the relative amount of angular displacement. This pulsating error voltage is applied across the input terminals 151 and 152 of the elevation servo-amplifier and causes the servo-motor $M_E$ to drive the transmitter $T_E$ in a direction dependent upon the polarity of the error voltage and at a speed dependent upon the amplitude of such voltage.

In response to the operation of the transmitter $T_E$ the elevation motor 419 of the searchlight unit causes the searchlight to be tilted in elevation until, when it has reached a tilted position corresponding to the elevation position of the radar antenna, the rotor winding of the elevation synchro receiver ERs, driven by the motor 419, will be rotated to such a position that no error voltage will be impressed upon the input terminals 459 and 460 of the elevation phase detector 424E and no error voltage will appear across the input terminals 151 and 152 of the elevation servo-amplifier. Thereupon the motor $M_E$ will come to rest and the transmitter $T_E$ will cease transmitting impulses to the motor 419 and the motor 419 will come to rest. Until the searchlight has been tilted in elevation to a position in agreement with the tilting of the radar antenna the needles of the elevation zero-reader meters 341, 411 and 503 will be deflected.

When the searchlight has thus been directed in azimuth and elevation into a position corresponding to the orientation of the radio beam on the target, the azimuth zero-reader meters 340, 410 and 502 and the elevation zero-reader meters 341, 411 and 503 will read zero. When the zero-reader meters are operated so that their needles register zero, the accurate pointing of the searchlight toward the target will be indicated.

When the target comes within searchlight range the operator at the searchlight unit will cause the arc in the searchlight lamp 300 to be struck by operating the arc switch 463. After the arc is struck the operator at the searchlight control station will slew the binoculars 331 by the operation of the azimuth hand wheel 328 and the operation of the elevation hand wheel (not shown) to coincide with the end of the searchlight beam. As soon as the target becomes visible to the operator he will operate the switch 339. With switch 339 operated relay 210 in the synchro step-by-step converter becomes operated thereby releasing relay 209.

Relay 209 upon releasing short-circuits the inputs of the azimuth and elevation servo-amplifiers, releases relays 211 and 213 and causes relays 212 and 214 to operate. Relays 211 and 213 upon releasing disconnect the transmitters TA and TE of the synchro step-by-step converter from the azimuth and elevation motors 418 and 419 of the searchlight unit. With the input terminals of the servo-amplifiers now short-circuited so that no error voltages may reach such amplifiers and the transmitters TA and TE disconnected, the radar unit has no further control of the searchlight unit. With relays 212 and 214 now operated the brushes of the azimuth and elevation transmitters AT and ET at the searchlight control station are connected over conductors of cable 324, over contacts of such relays and conductors of cable 433 with the azimuth and elevation motors 418 and 419 of the searchlight unit.

The operator at the searchlight control station may now operate the hand wheels of the station including the azimuth control wheel 328 and the elevation control wheel (not shown) to keep the binoculars 331 trained upon the target. The operation of such control wheels turns the brushes of the transmitters AT and ET to transmit impulses to the motors 418 and 419 and such motors then turn the searchlight in azimuth and elevation directions to maintain the searchlight beam directed upon the target.

The radar is now free to search for another target or to be associated with another searchlight and to direct such searchlight upon another target which may be tracked by such radar.

What is claimed is:

1. In a searchlight control system, a searchlight, a motor of the step-by-step type for turning said searchlight in azimuth, a radio direction and range device for tracking a target, a synchro transmitter responsive to the tracking of said target in accordance with the azimuth direction of the radio beam, a synchro receiver at said searchlight operable in accordance with the azimuth direction of the searchlight, means for connecting said synchro transmitter with said synchro receiver, means under the joint control of said synchros for generating an error voltage the polarity of which depends upon the direction of divergence between the positions of said synchros and the amplitude of which depends upon the amount of divergence, a servo-amplifier responsive to said error voltage, a servo-motor controlled by said amplifier, and a transmitter operable by said servo-motor for operating said searchlight turning motor to bring the azimuth direction of said searchlight into correspondence with the azimuth direction of the radio beam.

2. In a searchlight control system, a searchlight, a motor of the step-by-step type for tilting said searchlight in elevation, a radio direction and range device for tracking a target, a synchro transmitter responsive to the tracking of said target in accordance with the elevation direction of the radio beam, a synchro receiver at said searchlight operable in accordance with the elevation direction of the searchlight, means for connecting said synchro transmitter with said synchro receiver, means under the joint control of said synchros for generating an error voltage the polarity of which depends upon the direction of divergence between the positions of said synchros and the amplitude of which depends upon the amount of divergence, a servo-amplifier responsive to said error voltage, a servo-motor controlled by said amplifier and a transmitter operable by said servo-motor for operating said searchlight tilting motor to bring the elevation direction of said searchlight into correspondence with the elevation direction of the radio beam.

3. In a searchlight control system, a searchlight, a motor of the step-by-step type for turning said searchlight in azimuth, a radio direction and range device for tracking a target, a synchro transmitter responsive to the tracking of said target in accordance with the azimuth direction of the radio beam, a synchro receiver at said searchlight operable in accordance with the azimuth direction of the searchlight, a searchlight control station, a transmitter at said station for controlling said motor, circuits for interconnecting said synchros, means under the joint control of said synchros for generating an error voltage the polarity of which depends upon the direction of divergence between the positions of said synchros and the amplitude of which depends upon the amount of divergence, a servo-amplifier responsive to said error voltage, a servo-motor controlled by said amplifier, a transmitter operable by said servo-motor for operating said searchlight turning motor to bring the azimuth direction of said searchlight into correspondence with the azimuth direction of the radio beam, and relay means controllable from said station for removing the control of said turning motor from said latter transmitter and for placing said turning motor under the control of said control station transmitter.

4. In a searchlight control system, a searchlight, a motor of the step-by-step type for turning said searchlight in elevation, a radio direction and range device for tracking a target, a synchro transmitter responsive to the tracking of said target in accordance with the elevation direction of the radio beam, a synchro receiver at said searchlight operable in accordance with the elevation direction of the searchlight, a searchlight control station, a transmitter at said station for controlling said motor, circuits for interconnecting said synchros, means under the joint control of said synchros for generating an error voltage the polarity of which depends upon the direction of divergence between the positions of said synchros and the amplitude of which depends upon the amount of divergence, a servo-amplifier responsive to said error voltage, a servo-motor controlled by said amplifier, a transmitter operable by said servo-motor for operating said searchlight tilting motor to bring the elevation direction of said searchlight into correspondence with the elevation direction of the radio beam, and relay means controllable from said station for removing the control of said tilting motor from said latter transmitter and for placing said tilting motor under the control of said control station transmitter.

WILTON T. REA.

REFERENCES CITED

The following references are of record in the file of this patent:

UNITED STATES PATENTS

| Number | Name | Date |
|---|---|---|
| 1,743,794 | Murphy | Jan. 14, 1930 |
| 2,075,083 | Bernarde | Mar. 30, 1937 |
| 2,257,757 | Moseley | Oct. 7, 1941 |
| 2,347,590 | Binder | Apr. 25, 1944 |
| 2,376,359 | Hultin | May 22, 1945 |
| 2,399,426 | Bradley | Apr. 30, 1946 |
| 2,417,248 | Godet | Mar. 11, 1947 |

FOREIGN PATENTS

| Number | Country | Date |
|---|---|---|
| 555,052 | Great Britain | Aug. 3, 1943 |